(12) United States Patent
Wu et al.

(10) Patent No.: US 9,347,694 B2
(45) Date of Patent: May 24, 2016

(54) DUAL SUCTION COMPRESSOR WITH RAPID SUCTION PORT SWITCHING MECHANISM FOR MATCHING APPLIANCE COMPARTMENT THERMAL LOADS WITH COOLING CAPACITY

(71) Applicant: Whirlpool Corporation, Benton Harbor, MI (US)

(72) Inventors: Guolian Wu, St. Joseph, MI (US); Andrew Litch, St. Joseph, MI (US); Alberto Gomes, St. Joseph, MI (US); Nihat Cur, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 169 days.

(21) Appl. No.: 13/780,827

(22) Filed: Feb. 28, 2013

(65) Prior Publication Data

US 2014/0238059 A1 Aug. 28, 2014

(51) Int. Cl.
*F25B 1/00* (2006.01)
*F25B 1/10* (2006.01)
*F25B 5/02* (2006.01)
(Continued)

(52) U.S. Cl.
CPC ... *F25B 1/10* (2013.01); *F25B 5/02* (2013.01); *F25B 41/043* (2013.01); *F25B 49/02* (2013.01); *F25D 11/022* (2013.01); *F25B 2600/0251* (2013.01); *F25B 2600/2507* (2013.01); *Y02B 40/32* (2013.01)

(58) Field of Classification Search
CPC .............. F25B 1/00; F25B 19/00; F25B 1/10; F25B 41/043; F25B 49/02; F25D 11/022; F25D 5/02

USPC .................................. 62/115, 441, 443, 447
See application file for complete search history.

(56) References Cited

U.S. PATENT DOCUMENTS 2,123,497 A   7/1938   Buchanan
2,222,240 A   7/1947   Phillip
(Continued)

FOREIGN PATENT DOCUMENTS

EP   0583905 A1   2/1994
JP   2009079863   4/2009
(Continued)

OTHER PUBLICATIONS

Translation of WO 2011/134030 to Lilie.*
(Continued)

*Primary Examiner* — Mohammad M Ali (57) ABSTRACT

An appliance employing a coolant system that includes a compressor having a housing, a cooling capacity, and operably connected to typically two evaporators for regulating a temperature of the first compartment and a temperature of the second compartment; a shared coolant fluid connection system; a coolant fluid spaced within the shared coolant fluid connection system; and a switching mechanism operably connected to a first fluid conduit that provides shared coolant fluid to the compressor at a first pressure level and a second fluid conduit that provides shared coolant fluid to the compressor at a second pressure level where the second pressure level is less than the first pressure level wherein the switching mechanism is capable of regulating and switching shared coolant flow to the compressor from the first fluid conduit and the second fluid conduit.

20 Claims, 9 Drawing Sheets

(51) Int. Cl.
*F25B 41/04* (2006.01)
*F25B 49/02* (2006.01)
*F25D 11/02* (2006.01)

(56) References Cited

U.S. PATENT DOCUMENTS

| | | | |
|---|---|---|---|
| 2,423,386 A | 7/1947 | Hubacker | |
| 4,565,072 A | 1/1986 | Fujiwara et al. | |
| 4,685,309 A | 8/1987 | Behr | |
| 5,184,473 A | 2/1993 | Day | |
| 5,261,247 A * | 11/1993 | Knezic | F25D 11/022 62/117 |
| 5,465,591 A * | 11/1995 | Cur | F25B 5/02 62/199 |
| 6,067,815 A | 5/2000 | James | |
| 6,185,948 B1 * | 2/2001 | Niki et al. | 62/199 |
| 6,196,011 B1 * | 3/2001 | Bessler | 62/186 |
| 6,370,895 B1 * | 4/2002 | Sakuma et al. | 62/199 |
| 6,370,908 B1 * | 4/2002 | James | 62/434 |
| 6,408,634 B1 * | 6/2002 | Choi | 62/127 |
| 6,526,769 B2 * | 3/2003 | Kim | 62/199 |
| 6,598,410 B2 * | 7/2003 | Temmyo et al. | 62/179 |
| 6,729,150 B2 * | 5/2004 | Shin et al. | 62/199 |
| 6,952,930 B1 * | 10/2005 | Rafalovich et al. | 62/117 |
| 7,181,921 B2 | 2/2007 | Nuiding | |
| 7,418,833 B2 | 9/2008 | Kato et al. | |
| 7,475,557 B2 | 1/2009 | Yoshioka et al. | |
| 7,533,537 B2 | 5/2009 | Rafalovich et al. | |
| 2006/0288719 A1 * | 12/2006 | Shapiro et al. | 62/228.3 |
| 2007/0068193 A1 | 3/2007 | Yoon et al. | |
| 2007/0144190 A1 | 6/2007 | Temmyo et al. | |
| 2011/0011119 A1 * | 1/2011 | Kuehl et al. | 62/434 |
| 2013/0284395 A1 * | 10/2013 | Kamoshida et al. | 165/10 |

FOREIGN PATENT DOCUMENTS

| | | |
|---|---|---|
| JP | 2010014338 | 1/2010 |
| KR | 2008103853 | 11/2008 |
| WO | 2011134030 A2 | 11/2011 |

OTHER PUBLICATIONS

European Patent Application No. 14155448.5 filed Feb. 17, 2014, Applicant: Whirlpool Corporation, European Search Report re: same, mail date Aug. 6, 2014.

* cited by examiner

DUAL SUCTION COMPRESSOR WITH RAPID SUCTION PORT SWITCHING MECHANISM FOR MATCHING APPLIANCE COMPARTMENT THERMAL LOADS WITH COOLING CAPACITY

CROSS REFERENCE TO RELATED APPLICATIONS

This application is a continuation-in-part of U.S. patent application Ser. No. 13/279,386 entitled HIGHER EFFICIENCY APPLIANCE EMPLOYING THERMAL LOAD SHIFTING IN REFRIGERATORS HAVING HORIZONTAL MULLION filed on Oct. 24, 2011, as well as U.S. patent application Ser. No. 13/279,421 entitled HIGHER EFFICIENCY APPLIANCE EMPLOYING THERMAL LOAD SHIFTING IN REFRIGERATORS HAVING VERTICAL MULLION filed on Oct. 24, 2011, the disclosures of both applications are hereby incorporated by reference in their entireties.

BRIEF SUMMARY OF THE INVENTION

An aspect of the present invention is generally directed toward an appliance that includes a cabinet and a coolant system. The cabinet has an internal volume and includes a first compartment having an internal volume spaced within the cabinet and a second compartment having an internal volume spaced within the cabinet where the first compartment and the second compartment within the cabinet are separated by a mullion to form the first compartment and the second compartment within the cabinet and where the first compartment has a first compartment thermal load and the second compartment has a second compartment thermal load. The coolant system typically includes a compressor having a housing, a cooling capacity, and operably connected to a plurality of evaporators for regulating a temperature of the first compartment and a temperature of the second compartment; a shared coolant fluid connection system that interconnects at least the compressor, a first compartment evaporator associated with and capable of providing cooling to the first compartment and a second compartment evaporator associated with and capable of providing cooling to the second compartment; a coolant fluid spaced within the shared coolant fluid connection system used to regulate both the temperature of the first compartment and the second compartment; and a switching mechanism operably connected to a first fluid conduit that provides shared coolant fluid to the compressor at a first pressure level and a second fluid conduit that provides shared coolant fluid to the compressor at a second pressure level where the second pressure level is less than the first pressure level where the switching mechanism is capable of regulating and switching shared coolant flow to the compressor from the first fluid conduit and the second fluid conduit and is capable of switching shared coolant flow to the compressor between the first fluid conduit and the second fluid conduit in less than a second. The first compartment is at a first temperature and the second compartment is at a second temperature below the first temperature when the appliance is in operation. The switching mechanism at least substantially matches the first compartment and second compartment thermal loads with the cooling capacity provided by the compressor.

Yet another aspect of the present invention is generally directed to an appliance that includes a cabinet and a coolant system. The cabinet typically includes an internal volume and a first compartment having an internal volume spaced within the cabinet and a second compartment having an internal volume spaced within the cabinet where the first compartment and the second compartment within the cabinet are separated by a mullion to form the first compartment and the second compartment within the cabinet. The first compartment has a first compartment thermal load and the second compartment has a second compartment thermal load. The coolant system includes a single compressor having a housing, a cooling capacity, and operably connected to a plurality of evaporators for regulating at least a temperature of the first compartment and a temperature of the second compartment; a single condenser; a shared coolant fluid connection system that comprises fluid conduits that interconnect at least the single compressor, a first compartment evaporator associated with and capable of providing/configured to provide cooling to the first compartment and a second compartment evaporator associated with and capable of providing cooling to the second compartment; a plurality of thermal expansion devices where at least one thermal expansion device is positioned between the condenser and each of the plurality of evaporators systems and configured to receive coolant fluid from the condenser and deliver coolant fluid to one of the plurality of evaporators; a coolant fluid spaced within the shared coolant fluid connection system used to regulate both the temperature of the first compartment and the second compartment; and a switching mechanism operably connected to a first fluid conduit that provides shared coolant fluid to the compressor at a first pressure level and a second fluid conduit that provides shared coolant fluid to the compressor at a second pressure level where the second pressure level is less than the first pressure level where the switching mechanism is configured to regulate and switch shared coolant flow to the compressor from the first fluid conduit and the second fluid conduit and is configured to switch shared coolant flow to the compressor between the first fluid conduit and the second fluid conduit in less than a second. The first compartment is at a first temperature and the second compartment is at a second temperature below the first temperature when the appliance is in operation. The switching mechanism at least substantially matches the first compartment and second compartment thermal loads with the cooling capacity provided by the compressor.

Another aspect of the present invention includes a method for at least substantially matching thermal load of the compartments of a multi-compartment appliance comprising the steps of: providing a coolant system a single compressor having a housing, a cooling capacity, and operably connected to a plurality of evaporators for regulating at least a temperature of the first compartment and a temperature of the second compartment; a shared coolant fluid connection system that includes fluid conduits that interconnect at least the single compressor, a first compartment evaporator associated with and capable of providing cooling to the first compartment and a second compartment evaporator associated with and capable of providing cooling to the second compartment; a plurality of thermal expansion devices where at least one thermal expansion device is positioned between the condenser and each of the plurality of evaporators systems and configured to receive coolant fluid from the condenser and deliver coolant fluid to one of the plurality of evaporators; a coolant fluid spaced within the shared coolant fluid connection system used to regulate both the temperature of the first compartment and the second compartment; and a switching mechanism operably connected to a first fluid conduit that provides shared coolant fluid to the compressor at a first pressure level and a second fluid conduit that provides shared coolant fluid to the compressor at a second pressure level where the second pressure level is less than the first pressure level where the switching mechanism is configured to regulate and switch shared coolant flow to the compressor from the first fluid conduit and the second fluid conduit and is configured to switch shared coolant flow to the compressor between the first fluid conduit and the second fluid conduit in less than a second. The first compartment is at a first temperature and the second compartment is at a second temperature below the first temperature when the appliance is in operation; and adjusting flow of shared refrigerant from at least the first compartment evaporator and the second compartment evaporator using a switching mechanism based upon the sensed thermal load of the first compartment and the sensed thermal load of the second compartment so that the thermal load of the first compartment and the second compartment at least substantially correspond to the cooling capacity provided by the compressor.

These and other features, advantages, and objects of the present invention will be further understood and appreciated by those skilled in the art by reference to the following specification, claims, and appended drawings.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings, certain embodiment(s) which are presently preferred. It should be understood, however, that the invention is not limited to the precise arrangements and instrumentalities shown. Drawings are not necessarily to scale, but relative special relationships are shown and the drawings may be to scale especially where indicated. As such, in the description or as would be apparent to those skilled in the art. Certain features of the invention may be exaggerated in scale or shown in schematic form in the interest of clarity and conciseness.

DETAILED DESCRIPTION

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

In this specification and the appended claims, the singular forms "a," "an" and "the" include plural reference unless the context clearly dictates otherwise.

The present invention is generally directed toward appliance systems and methods for increasing the efficiency (coefficient of performance) of the appliance. The appliance systems may be bottom mount freezer systems (see FIG. 3), top mount freezer systems (see FIG. 4), side by side refrigerator and freezer system (see FIGS. 1 and 5), or french door style bottom mount freezer systems that may or may not employ a third compartment, typically a drawer that may operate as a refrigerator drawer or a freezer drawer (not shown).

Figure 1:
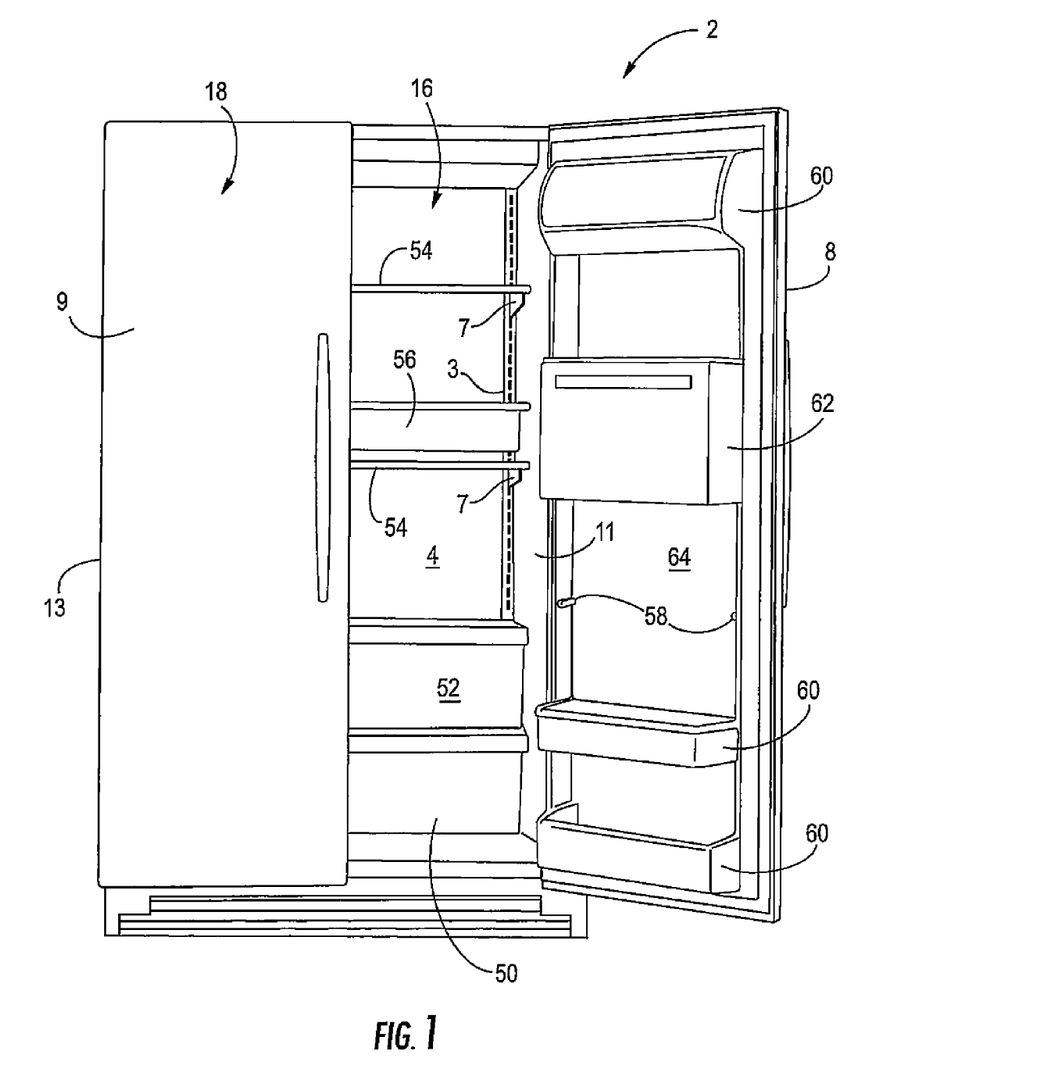
FIG. 1 is a perspective view of a side-by-side refrigerator freezer incorporating the multiple evaporator system.

The refrigerator 2 is adapted to receive and/or be capable of receiving a variety of shelves and modules at different positions defined by, in the embodiment shown in FIG. 1, a plurality of horizontally spaced vertical rails 3 extending from the rear wall 4 of the refrigerator and freezer cabinet sections 16, 18. In the embodiment shown, the supports are in the form of vertically extending rails 3 with vertically spaced slots for receiving mounting tabs on shelf supports 7 and similar tabs on modules, such as modules 50 (crisper), 52 (crisper), 54 (shelf unit), and 56 (drawer), for attaching the modules in cantilevered fashion to the cabinet sections 16, 18 at selected incrementally located positions. The inside edges of doors 8 and 9 also include vertically spaced shelf supports, such as 58, for positioning and engaging bins 60 and modules, such as 62, in the doors, in particular within the pocket of the door defined by the liner 64. The shelves, modules, bins, and the like, can be located at a variety of selected locations within the cabinet sections 16 and 18 and doors 8 and 9 to allow the consumer to select different locations for convenience of use.

Some of the modules in refrigerator 2, such as modules 50 and 62, may be powered modules or components and therefore require operating utilities. Thus, for example, module 50 may be a powered crisper or an instant thaw or chill module and may require utilities, such as cooled or heated fluids or electrical operating power and receive these utilities from the appliance. Other modules, such as module 26, may likewise require operational utilities while modules, such as a passive crisper module, would not. Door modules also, such as module 62, may, for example, include a water dispenser, vacuum bag sealer or other accessory conveniently accessible either from the outside of door 8 or from within the door and likewise may receive operating utilities from conduits, such as disclosed in application Ser. No. 12/469,915 filed May 21, 2009, entitled Refrigerator Module Mounting System; and Ser. No. 12/469,968 filed May 21, 2009, entitled Multiple Utility Ribbon Cable. The disclosures of these patent applications are incorporated herein by reference in their entirety. While not shown in the Figures, the modules may also be used for quick cooling of beverages, quick freezing/chilling of other food stuffs or even making of ice, ice pieces (cubes), or frozen products.

The present invention includes the use of sequential dual evaporator systems that employ a switching mechanism. The switching mechanism allows the system to better match total thermal loads with the cooling capacities provided by the compressor. Generally speaking, the appliance gains efficiency by employing the switching mechanism, which allows rapid suction port switching, typically on the order of a fraction of a second. The switching mechanism can be switched at a fast pace, typically about 30 seconds or less or exactly 30 seconds or less, more typically about 0.5 seconds or less or exactly 0.5 seconds or less, and most typically about 10 milliseconds or less or exactly 10 milliseconds or less (or any time interval from about 30 seconds or less). As a result, the system rapidly switches between a freezer compartment operation mode and a refrigeration (fresh food) operation mode. The compressor 12 may be a variable capacity compressor, such as a linear compressor, in particular an oil-less linear compressor, which is an orientation flexible compressor (i.e., it operates in any orientation not just a standard upright position, but also a vertical position and an inverted position, for example). The compressor is typically a dual suction compressor (See FIG. 6) or a single suction compressor (See FIG. 7) with an external switching mechanism. When the compressor is a single suction compressor, it typically provides non-simultaneous dual suction from the coolant fluid conduits 20 from the refrigeration (fresh food) compartment and the freezer compartment.

As discussed above and shown generally in FIG. 2, the coolant system 10 utilized according to an aspect of the present invention typically includes a compressor 12 operably connected to at least one evaporator 14 where the compressor is typically the only compressor associated with the appliance for regulating the temperature of the first compartment 16 (typically the fresh food compartment) and the temperature of a second compartment 18 (typically the freezer compartment). The coolant system also typically employs: fluid conduits 20; at least one condenser 22, but typically a single condenser; a filter/dryer 24; and one or more expansion devices 26, such as a capillary tube or capillary tubes. The coolant system may also optionally employ one or more check valves 29 that prevent back flow of coolant fluid in the overall coolant system in the lower pressure fluid conduit. Check valves are typically employed when a multiple evaporator coolant system is employed operating in a non-simultaneous manner.

Figure 2:
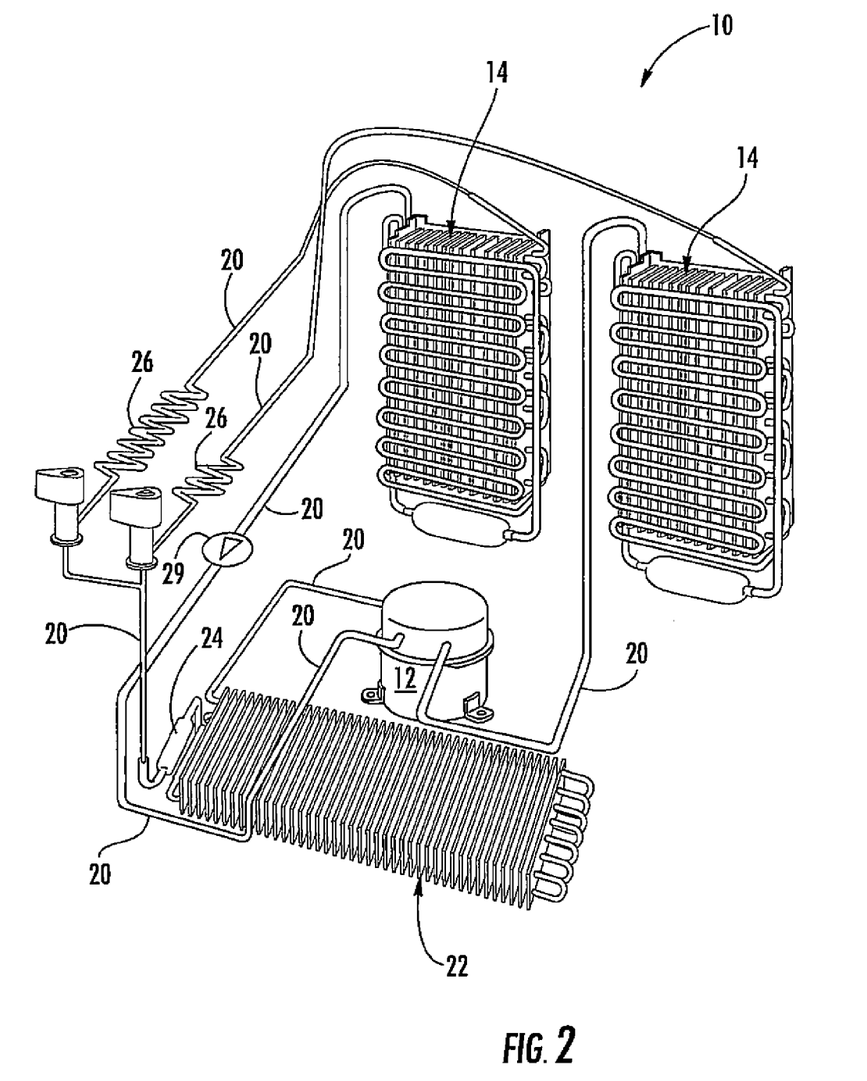
FIG. 2 is a schematic of a sequential dual evaporator system that may be utilized according to an aspect of the present invention.

As shown in FIG. 2, one aspect of the present invention utilizes a sequential, dual evaporator refrigeration system as the coolant system 10. The dual evaporator refrigeration system shown in FIG. 2 employs two evaporators 14 fed by two fluid conduits 20 engaged to two separate expansion devices 26. Due to the evaporating pressure differences needed to cool the two compartments at different operating temperatures, the evaporators cannot operate simultaneously and thus are activated as cooling is needed in a given compartment. In this sense, a major advantage of the dual (or multiple) evaporator system is that the evaporator in the refrigerator compartment runs at a higher temperature than a freezer compartment evaporator, thereby increasing the overall coefficient of performance (See FIG. 3).

Figure 3:
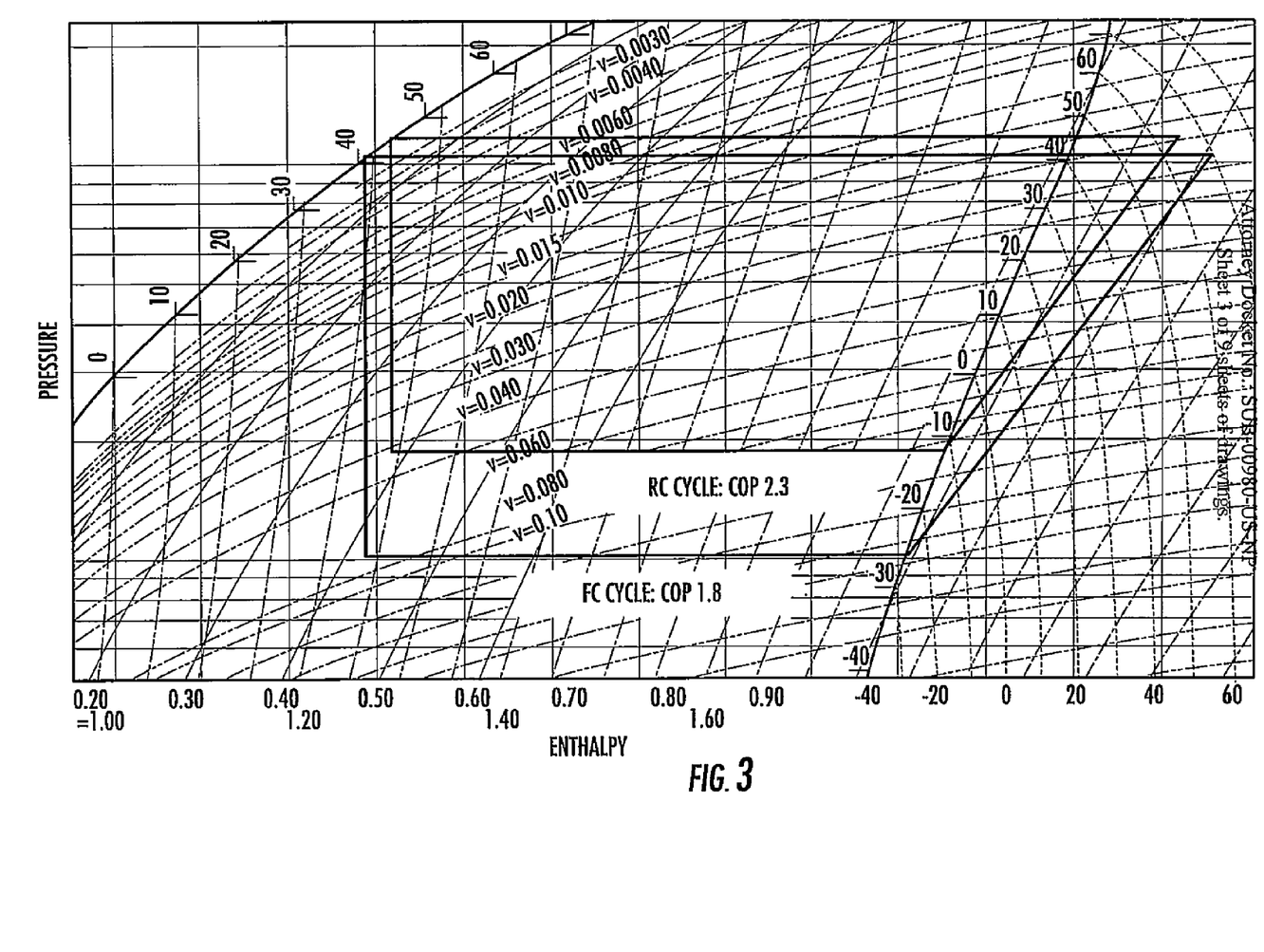
FIG. 3 is a thermodynamic cycle of a sequential dual evaporator refrigeration system that may be utilized in connection with the thermal load shifting employing methods of improving efficiency of the appliance according to an aspect of the present invention.

The cycle analysis (shown in FIG. 3) indicates an approximate 28% increase in the overall coefficient of performance in such a system. This assumes that the refrigeration compartment represents about ⅓ of the total heat load and the evaporators in the refrigeration compartment and the freezer compartment operate at −15° F. (freezer compartment) and 10° F. (refrigeration compartment evaporator). The evaporators maintain the refrigeration (fresh food) compartment and the freezer compartment temperatures at 45° F. and 5° F. respectively. As shown in FIG. 3, the thermodynamic cycles of a sequential dual evaporator refrigeration system gains efficiency from the sequential dual evaporator's use in connection with the refrigeration compartment operation. The refrigeration compartment operation enables the refrigeration system to have a much higher cycle efficiency due to the higher operating temperature. The overall coefficient of performance is a weighted average of the coefficient of performance of the freezer operation and the refrigeration (fresh food) compartment operation as follows:

$$COP_{Total} = x \times COP_{RC} + (1-x) \times COP_{FC}$$

"x" is the ratio refrigerator compartment heat gain to the total heat gain. The same general calculation is applicable when the compartments are both refrigeration compartments or both freezer compartments, but where one compartment is operated at a higher operating temperature than another compartment of the appliance. The overall coefficient of performance depends on the ratio of the refrigeration compartment heat gain to that of the entire appliance. The higher this ratio, the better the overall coefficient of performance.

As discussed above, the first compartment is typically the refrigeration or fresh food compartment. The second is typically the freezer compartment. While this is the typical configuration, the configuration could conceivably be two refrigeration compartments or two freezer compartments. So long as the first compartment is at a higher temperature than the second compartment, whether both are above freezing or below freezing, efficiencies are gained.

Figure 4:
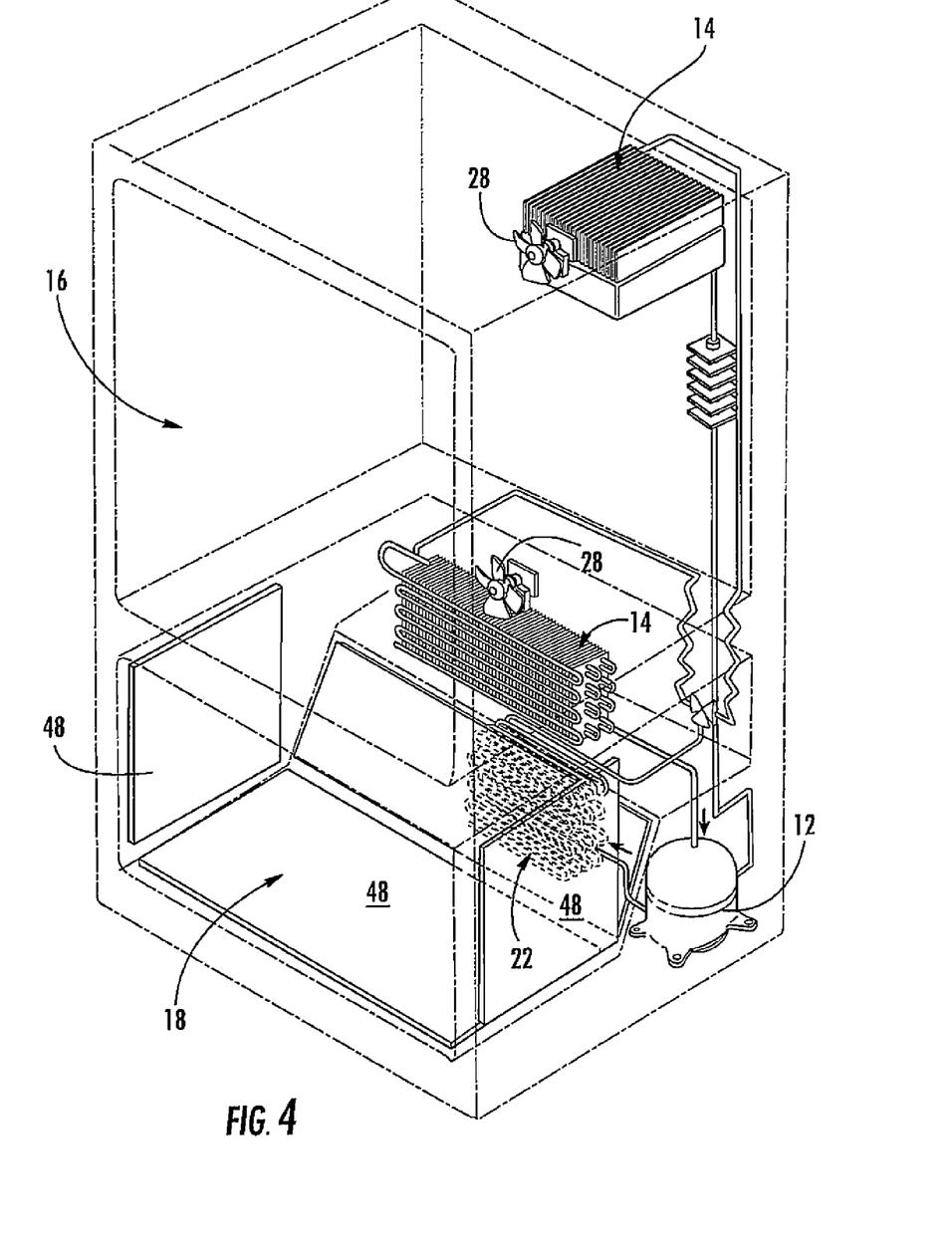
FIG. 4 is an interior schematic view of a dual evaporator refrigeration system according to an aspect of the present invention.
Figure 5:
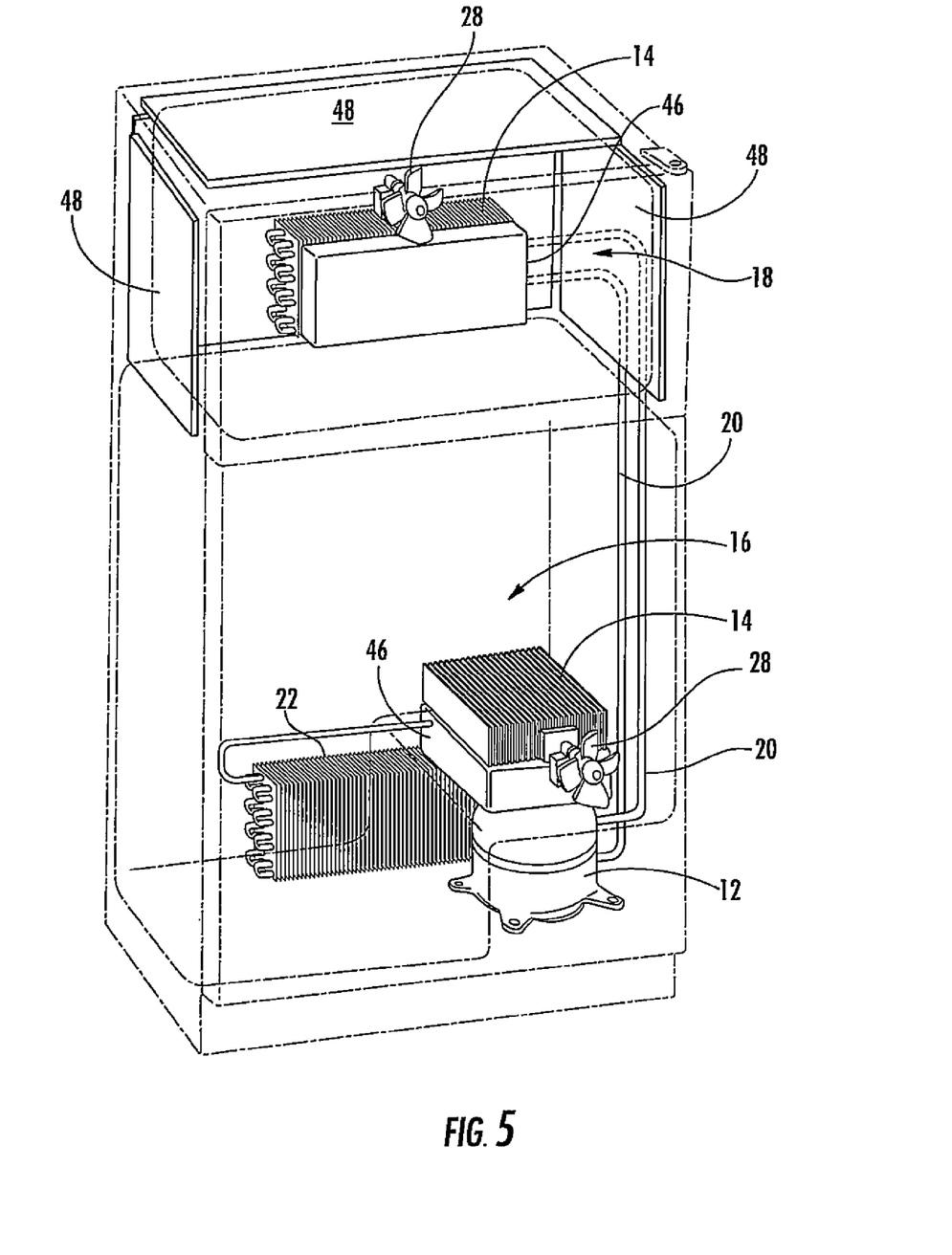
FIG. 5 shows a schematic view of a system according to the present invention incorporated into a top mount freezer configuration with a horizontal oriented mullion.
Figure 6:
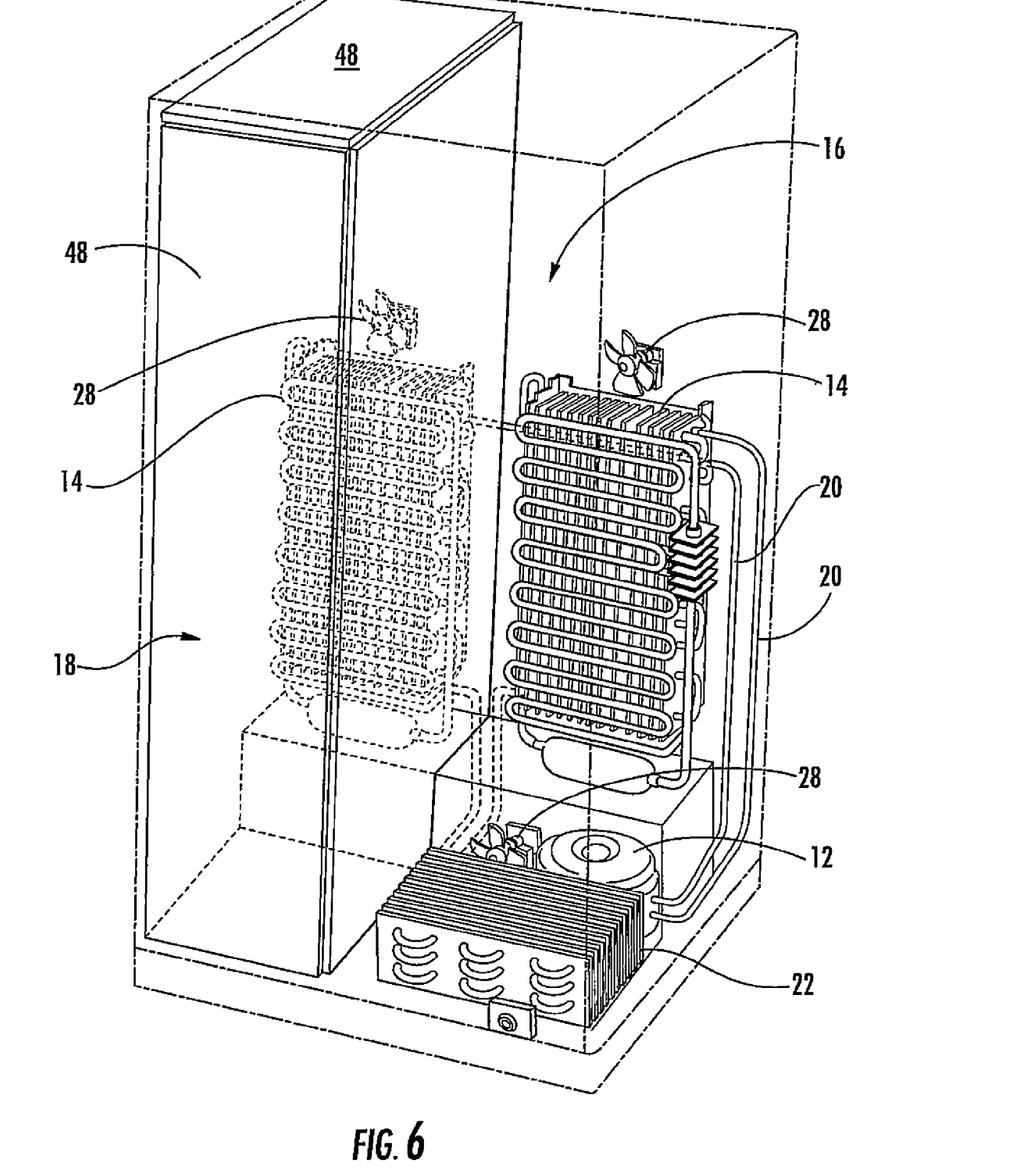
FIG. 6 shows a schematic view of another aspect of the present invention showing a coolant system in a side by side appliance system with a vertical mullion.

As shown in various figures, including FIGS. 4-6; the appliance may be any of the known configurations for a refrigeration appliance typically employed. The cooling systems may be incorporated into a variety of appliance configurations, including a bottom mount freezer system (FIG. 4), a top mount freezer system (FIG. 5), a side by side configuration (FIG. 6), and a French door configuration that may or may not further include an optional third drawer that may function as either a freezer or a refrigerator (fresh food) compartment.

Generally speaking, each of the embodiments employ at least two compartments, a first compartment 16, which is typically a fresh food compartment or a compartment operating at a higher operating temperature than a second compartment 18, which is typically a freezer compartment. Also, generally speaking each compartment has its own evaporator associated with it. For example, while two evaporators are typically employed (one for the fresh food compartment and the other for the freezer compartment) a third may be used and associated with an optional third drawer. Fluid conduits 20 provide fluid flow from the compressor to at least one condenser 22, through a filter/dryer 24 (when utilized), through at least one expansion device 26 such as a capillary tube or tubes, and to at least one evaporator, more typically multiple evaporators. Ultimately, fluid is returned to the compressor. Fans 28, which are optional, are generally positioned proximate the evaporator(s) to facilitate cooling of the compartment/heat transfer. Similarly, fans 28 may be used in conjunction with the condenser (see FIG. 6). Typically, fans improve heat transfer effectiveness, but are not necessary.

In the case of the top mount and bottom mount freezer, the mullion separating the compartments is typically a horizontal mullion. In the case of a side by side configuration, the mullion separating the two compartments is a vertical mullion.

Figure 10:
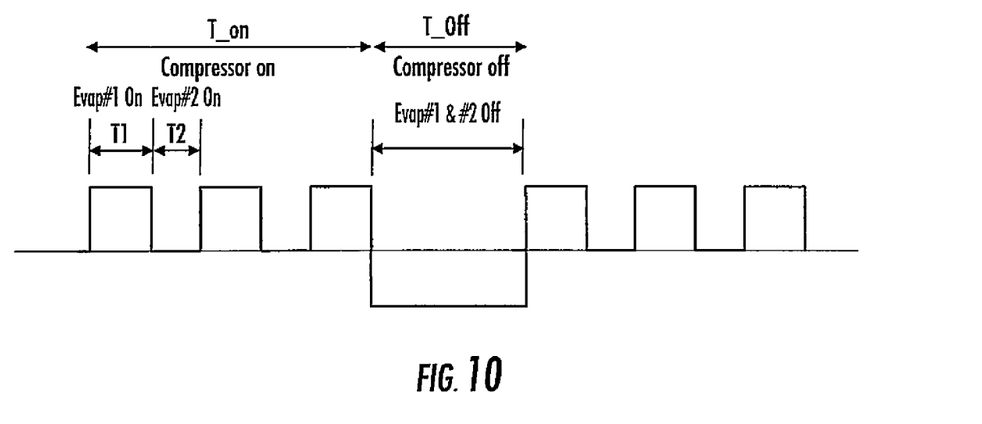
FIG. 10 is a schematic graphical illustration of a timeline when a higher pressure suction port is open (designated T1) and a lower suction port is open (designated T2) and graphically demonstrating the extended compressor on time and off time for improved efficiency while maintaining cooling capacity matching with thermal load of each compartment.

An aspect of the present invention includes increasing the efficiency of the appliance by rapidly switching between a freezer compartment operation mode and a refrigerator compartment operation mode. As shown in FIG. 10, T1 is the opening time of the high pressure suction port and T2 is the opening time of the low pressure suction port. T_on is the compressor on time and the T_off is the compressor off time. By varying T1, T2, T_on and T_off, it is possible to completely match or at least substantially match the freezer compartment thermal load, the refrigerator compartment thermal load and the total thermal load with the cooling capacity (fixed or variable) provided by the compressor to thereby increase the overall coefficient of performance of the coolant system of the appliance. It is also possible to further improve the efficiency of the system by also regulating and varying appropriately the fan(s) and/or compressor cooling capacity modulation through, for example, compressor speed or stroke length in the case of a linear compressor.

Additionally, a control unit 70 that may optionally receive one or more signals or other input from a user input such as the desired compartment temperature for a given compartment or, for example, temperature sensors within a compartment or input from the compressor regarding the cooling capacity being supplied by the compressor. The control unit, which might be a computer system or processor such as a microprocessor, for example, is typically configured to dynamically adjust the switching mechanism based upon one or more or all of these inputs to create the most efficient system possible. The control unit also may control and regulate the total cooling capacity being supplied by the compressor when the compressor is a variable capacity compressor such as a linear compressor or an oil-less, orientation flexible linear compressor.

Figures 7, 8A:
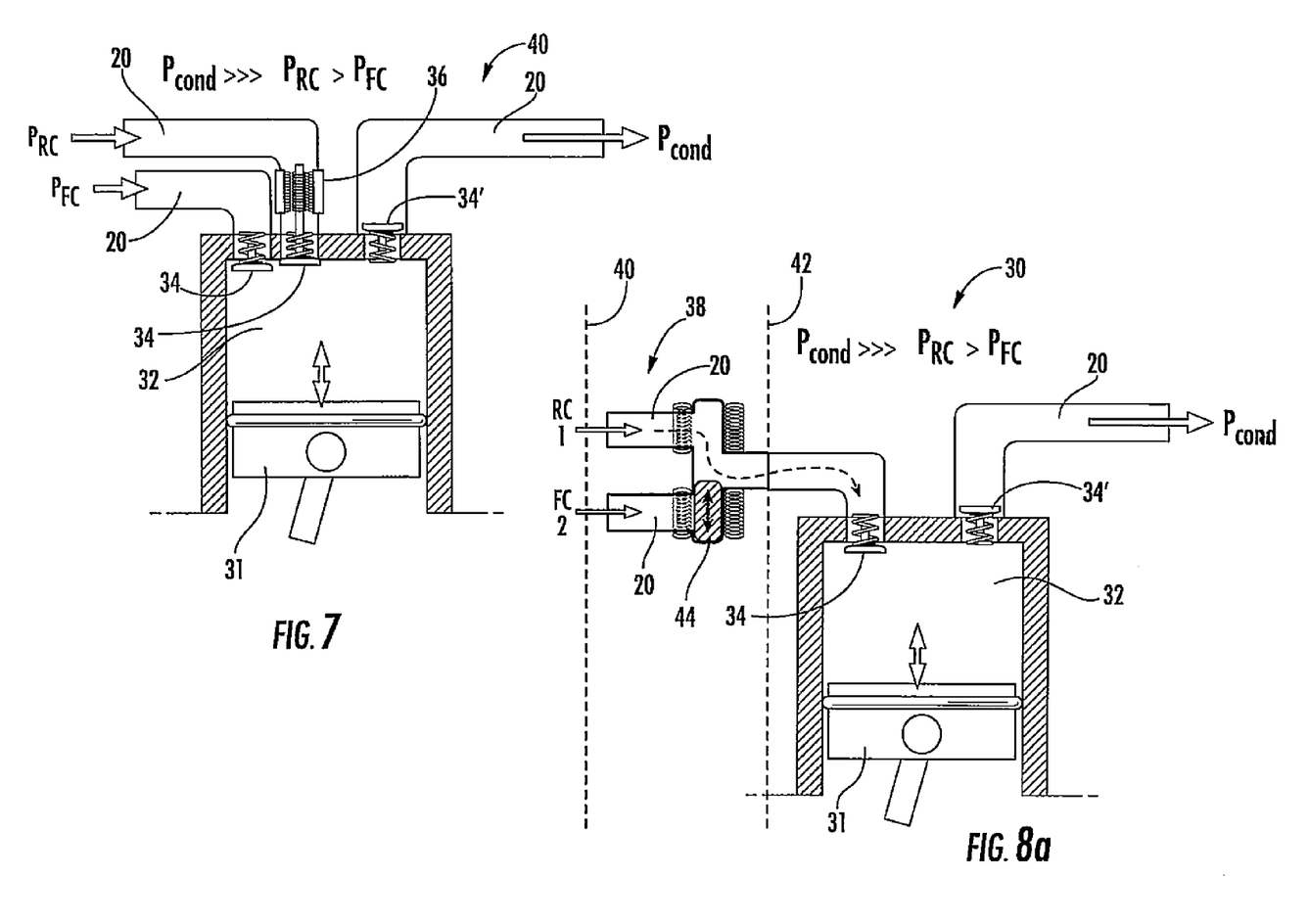
FIG. 7 shows a compressor according to an aspect of the present invention showing dual suction.
FIG. 8a shows another embodiment of a compressor employing a three-way valve either inside the compressor or outside the compressor housing (the housing shown by the dashed line) according to an aspect of the present invention showing dual suction.
Figure 8B:
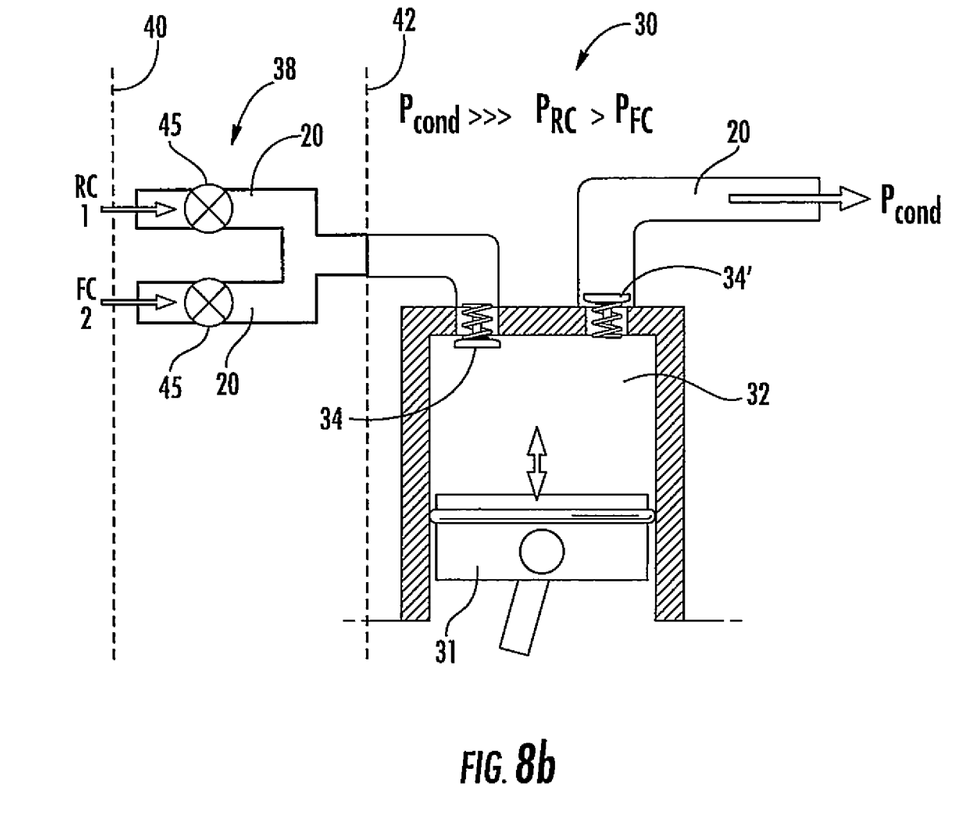
FIG. 8b shows another embodiment of a compressor employing two solenoid valves on either inside the compressor or outside the compressor housing (the housing shown by the dashed line) according to an aspect on the present invention showing duel suction.

The compressor 12 may be a standard reciprocating or rotary compressor, a variable capacity compressor, including but not limited to a linear compressor, or a multiple intake compressor system (see FIGS. 7-8a-b). When a standard reciprocating or rotary compressor with a single suction port is used the system further includes a compressor system 30 (see FIG. 8a-b). As shown in FIG. 7, a compressor according to an aspect of the present invention may utilize a compressor system 40 that contains two coolant fluid intake streams from the refrigerator compartment or the freezer compartment evaporator(s). When a linear compressor, which can be on oil less linear compressor, is utilized, the linear compressor has a variable capacity modulation, which is typically larger than a 3 to 1 modulation capacity typical with a variable capacity reciprocating compressor. The modulation low end is limited by lubrication and modulation scheme.

FIGS. 7 and 8a, and 8b generally show switching mechanisms according to the present invention. FIG. 7, as discussed above, is a valving system that is used in dual suction port compressor systems. FIGS. 8a and 8b are a switching mechanism that can be positioned either external or within a single suction port system that allows for two or more fluid conduits to feed into the single suction port. A compressor piston 31 is utilized in both dual coolant fluid intake systems shown in FIGS. 7, 8a, and 8b. In the case of FIG. 7, coolant fluid is received into the piston chamber 32 from the refrigerator compartment and freezer compartment (first compartment and second compartment) fluid conduits when the piston 31 is drawn backward, the piston chamber valves 34 are both opened, or, when the solenoid switch 36 is activated, only coolant fluid from the second compartment (freezer compartment) fluid conduit is drawn in, and the piston chamber intake valve 34 associated with the intake from the first compartment (fresh food/refrigeration compartment) fluid conduit is not actuated, but retained in a closed position. When the piston stroke is actuated toward the piston chamber valves, piston chamber valve 34' is opened by fluid pressure to allow coolant fluid to pass to the condenser 22.

An alternative embodiment is shown in FIGS. 8a and 8b, which show a single piston chamber intake valve 34, which is fed from a valving system/switching mechanism 38. The valving system 38 as shown by lines 40 and 42, which represent the housing of the compressor, may be within the housing of the compressor when the housing is at position 40 relative to the valving system 38 and outside of the housing when the housing is in position 42 relative to the valving system 38. The position of the housing (represented by reference numerals 40 and 42) in FIGS. 8a and 8b are simply meant to display that the valving system may be outside of the housing or within the housing of the compressor. The valving system 38 employs a switching mechanism, which typically is a magnetically actuated solenoid system where obstruction 44 is actuated between a first position (shown in FIG. 8a) allowing refrigerant coolant to flow from the refrigeration compartment evaporator and a second position (not shown) where the obstruction 44 is positioned to block fluid paths from the refrigerator compartment evaporator and allow refrigerant to flow from the freezer compartment evaporator. The alternative embodiment shown in FIG. 8b shows two solenoid valves 45 that may be controlled by the control unit to be in an open or closed position. The solenoid valves alternate coolant flow to the compressor between coolant from the first fluid conduit. The solenoid valves are typically only opened one at a time. In the embodiments of FIG. 7, 8a, or 8b of the compressor systems, the pressure of the coolant fluid leaving the compressor for the condenser is significantly higher than the pressure of the coolant received from the refrigeration compartment or the freezer compartment, but the pressure of the coolant received from the refrigeration compartment fluid conduit is greater than the coolant received from the freezer compartment fluid conduit. This, as discussed above, allows for greater efficiencies of the overall coolant system.

Figure 9:
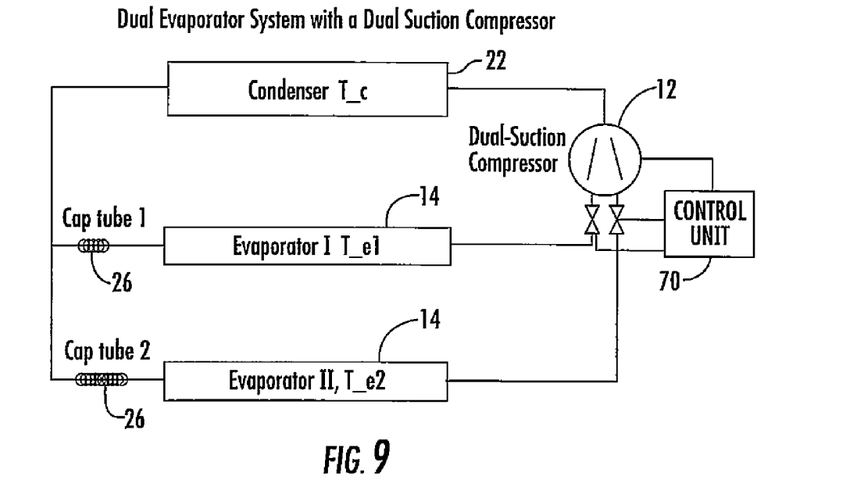
FIG. 9 shows a schematic view of another aspect of the present invention showing a coolant system employing two evaporators driven by a single, dual suction compressor.

The general schematic of a sequential dual evaporator system employing a dual suction compressor or a single suction compressor employing the valving and switching mechanism discussed above is shown in FIG. 9.

Thermal storage material may also be used to further enhance efficiencies of the appliance. Thermal storage material 46, which can include phase changing material or high heat capacity material or high heat capacity material such as metal solids can be operably connected to the first compartment evaporator. The thermal storage material may be in thermal contact or engagement with the first compartment evaporator, in thermal contact or engagement with the fluid line operably connected to the first compartment evaporator, or in thermal contact or engagement with both. The use of the thermal storage material helps prevent relatively short relatively short "down" time of the compressor. Similarly, a thermal storage material can be associated with the second evaporator/compartment. Additionally, the second compartment may have vacuum insulation panels 48 insulating it to further improve the efficiency of the system by driving more of the thermal load to the first compartment.

Those skilled in the art will recognize, or be able to ascertain using no more than routine experimentation, many equivalents to the specific embodiments of the invention described herein. Such equivalents are intended to be encompassed by the following claims.

The invention claimed is:

1. An appliance comprising:
a cabinet having an internal volume and comprising a first compartment having an internal volume spaced within the cabinet and a second compartment having an internal volume spaced within the cabinet where the first compartment and the second compartment within the cabinet are separated by a mullion to form the first compartment and the second compartment within the cabinet and wherein the first compartment has a first compartment thermal load and the second compartment has a second compartment thermal load; a coolant system comprising:
a compressor having a housing, a cooling capacity, and operably connected to a plurality of evaporators for regulating a temperature of the first compartment and a temperature of the second compartment;
a shared coolant fluid connection system that interconnects at least the compressor, a first compartment evaporator associated with and capable of providing cooling to the first compartment and a second compartment evaporator associated with and capable of providing cooling to the second compartment;
a coolant fluid spaced within the shared coolant fluid connection system used to regulate both the temperature of the first compartment and the second compartment;
and a switching mechanism operably connected to a first fluid conduit that provides shared coolant fluid to the compressor at a first pressure level and a second fluid conduit that provides shared coolant fluid to the compressor at a second pressure level where the second pressure level is less than the first pressure level wherein the switching mechanism regulates and switches shared coolant flow to the compressor from the first fluid conduit and the second fluid conduit and switches shared coolant flow to the compressor between the first fluid conduit and the second fluid conduit in less than about 10 milliseconds by controlling the switching mechanism by a controller;
wherein the first compartment is at a first temperature and the second compartment is at a second temperature below the first temperature when the appliance is in operation;
and wherein the switching mechanism at least substantially matches the first compartment and second compartment thermal loads with the cooling capacity provided by the compressor.

2. The appliance of claim 1, wherein the compressor is a variable capacity compressor.

3. The appliance of claim 2, wherein the variable capacity compressor is a linear compressor.

4. The appliance of claim 1, wherein the switching mechanism is within the housing of the compressor.

5. The appliance of claim 1, wherein with switching mechanism is positioned external from the compressor housing and receives shared refrigerant from the first shared coolant fluid conduit and the second shared fluid conduit and delivers a single shared coolant fluid flow to the compressor.

6. The appliance of claim 5, wherein the first shared coolant fluid conduit is operably connected to deliver shared coolant from the first evaporator to the compressor and the second shared coolant fluid conduit is operably connected to deliver shared coolant flow from the second evaporator.

7. The appliance of claim 5, wherein the first compartment is a fresh food compartment and the second compartment is a freezer compartment and the compressor is an oil-less compressor.

8. The appliance of claim 5, wherein the first compartment and the second compartment are chosen from the group consisting of: a freezer compartment and a fresh food compartment; both a freezer compartment; and both a fresh food compartment.

9. The appliance of claim 1, wherein the compressor is the only compressor operably connected with the coolant system further comprises a condenser operably connected with the coolant system that is the only condenser operably connected with the coolant system.

10. The appliance of claim 1 further comprising a control unit in communication with the switching mechanism and configured to dynamically adjusts suction from the first fluid conduit and the second fluid conduit in response to the cooling capacity being provided by the compressor and the thermal loads of the first compartment and the second compartment such that the coolant system at least substantially matches the first compartment and second compartment thermal loads with the cooling capacity provided by the compressor.

11. The appliance of claim 1 further comprising a first evaporator thermal storage material operably and thermally engaged with the first evaporator.

12. The appliance of claim 11 further comprising a second evaporator thermal storage material operably and thermally engaged with the second evaporator.

13. The appliance of claim 10, where in the control unit is a chosen from the group consisting of a computer system and a microprocessor.

14. The appliance of claim 1, wherein the switching mechanism is chosen from the group consisting of: (1) a solenoid valve configured to engage and disengage a valve of the compressor piston that receives coolant fluid from the first compartment evaporator, (2) a valving system that comprises a magnetically actuated solenoid to actuate an obstruction between a first position that blocks coolant fluid flow from one evaporator and a second position that blocks coolant fluid flow from another evaporator; and (3) solenoid valves on each of the first fluid conduit and the second fluid conduit configured to alternate coolant fluid flow.

15. An appliance comprising:
a cabinet having an internal volume and comprising a first compartment having an internal volume spaced within the cabinet and a second compartment having an internal volume spaced within the cabinet where the first compartment and the second compartment within the cabinet are separated by a mullion to form the first compartment and the second compartment within the cabinet and wherein the first compartment has a first compartment thermal load and the second compartment has a second compartment thermal load;

a coolant system comprising:

a single compressor having a housing, a cooling capacity, and operably connected to a plurality of evaporators for regulating at least a temperature of the first compartment and a temperature of the second compartment;

a single condenser;

a shared coolant fluid connection system that comprises fluid conduits that interconnect at least the single compressor, a first compartment evaporator associated with and capable of providing cooling to the first compartment and a second compartment evaporator associated with and capable of providing cooling to the second compartment;

a plurality of thermal expansion devices wherein at least one thermal expansion device is positioned between the condenser and each of the plurality of evaporators systems and configured to receive coolant fluid from the condenser and deliver coolant fluid to one of the plurality of evaporators;

a coolant fluid spaced within the shared coolant fluid connection system used to regulate both the temperature of the first compartment and the second compartment; and a switching mechanism operably connected to a first fluid conduit that provides shared coolant fluid to the compressor at a first pressure level and a second fluid conduit that provides shared coolant fluid to the compressor at a second pressure level where the second pressure level is less than the first pressure level wherein the switching mechanism regulates and switches shared coolant flow to the compressor from the first fluid conduit and the second fluid conduit and switches shared coolant flow to the compressor between the first fluid conduit and the second fluid conduit in less than about 10 milliseconds by controlling the switching mechanism by a controller;

wherein the first compartment is at a first temperature and the second compartment is at a second temperature below the first temperature when the appliance is in operation; and wherein the switching mechanism at least substantially matches the first compartment and second compartment thermal loads with the cooling capacity provided by the compressor.

16. The appliance of claim 15, wherein the single compressor is a single, multi-suction port compressor having at least a number of suction ports that corresponds to the number of evaporators used in the coolant system wherein each suction port is operably engaged by separate fluid conduits to different evaporators and configured to receive cooling fluid from a single evaporator.

17. The appliance of claim 15, wherein the compressor is a linear compressor and the appliance further comprises a control unit operably engaged to convey signals to the switching mechanism and receive signals from at least the compressor regarding the compressors cooling capacity.

18. The appliance of claim 17, wherein the control unit is in communication with the switching mechanism and configured to dynamically adjusts suction from the first fluid conduit and the second fluid conduit in response to the cooling capacity being provided by the compressor and the thermal loads of the first compartment and the second compartment such that the coolant system at least substantially matches the first compartment and second compartment thermal loads with the cooling capacity provided by the compressor.

19. A method for at least substantially matching thermal load of the compartments of a multi-compartment appliance comprising the steps of:

providing a coolant system comprising:

a single compressor having a housing, a cooling capacity, and operably connected to a plurality of evaporators for regulating at least a temperature of the first compartment and a temperature of the second compartment;

a shared coolant fluid connection system that comprises fluid conduits that interconnect at least the single compressor, a first compartment evaporator associated with and capable of providing cooling to the first compartment and a second compartment evaporator associated with and capable of providing cooling to the second compartment;

a plurality of thermal expansion devices wherein at least one thermal expansion device is positioned between a condenser and each of the plurality of evaporators systems and configured to receive coolant fluid from the condenser and deliver coolant fluid to one of the plurality of evaporators;

a coolant fluid spaced within the shared coolant fluid connection system used to regulate both the temperature of the first compartment and the second compartment; and a switching mechanism operably connected to a first fluid conduit that provides shared coolant fluid to the compressor at a first pressure level and a second fluid conduit that provides shared coolant fluid to the compressor at a second pressure level where the second pressure level is less than the first pressure level wherein the switching mechanism regulates and switches shared coolant flow to the compressor from the first fluid conduit and the second fluid conduit and switches shared coolant flow to the compressor between the first fluid conduit and the second fluid conduit in less than about 10 milliseconds by controlling the switching mechanism by a controller; and wherein the first compartment is at a first temperature and the second compartment is at a second temperature below the first temperature when the appliance is in operation; and adjusting flow of shared refrigerant from at least the first compartment evaporator and the second compartment evaporator using a switching mechanism based upon the sensed thermal load of the first compartment and the sensed thermal load of the second compartment so that the thermal load of the first compartment and the second compartment at least substantially correspond to the cooling capacity provided by the compressor.

20. The method of claim 19, wherein compressor is a variable capacity compressor with varying cooling capacity and the step of adjusting the flow of shared refrigerant comprises adjusting the refrigerant flow based upon the sensed thermal load of the first compartment and the sensed thermal load of the second compartment so that the thermal load of the first compartment and the second compartment at least substantially correspond to the varying cooling capacity provided by the variable capacity compressor.

* * * * *